(12) United States Patent
Florent et al.

(10) Patent No.: US 10,843,806 B2
(45) Date of Patent: Nov. 24, 2020

(54) AIRCRAFT PROPULSION ASSEMBLY WITH A FILTERED CRADLE

(71) Applicant: SAFRAN AIRCRAFT ENGINES, Paris (FR)

(72) Inventors: Nicolas Marc Florent, Paris (FR); Geoffroy Marie Gerard Nicq, Thomery (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 531 days.

(21) Appl. No.: 15/498,722

(22) Filed: Apr. 27, 2017

(65) Prior Publication Data

US 2017/0313431 A1  Nov. 2, 2017

(30) Foreign Application Priority Data

Apr. 28, 2016  (FR) ...................................... 16 53824

(51) Int. Cl.
*B64D 27/16* (2006.01)
*B64D 27/12* (2006.01)
(Continued)

(52) U.S. Cl.
CPC .............. *B64D 27/16* (2013.01); *B64D 27/10* (2013.01); *B64D 27/12* (2013.01); *B64D 27/18* (2013.01);
(Continued)

(58) Field of Classification Search
CPC ........ B64D 27/00; B64D 27/10; B64D 27/12; B64D 27/16; B64D 27/18; B64D 27/26;
(Continued)

(56) References Cited

U.S. PATENT DOCUMENTS 2,722,391 A * 11/1955 Krieghoff ............... F16F 1/406
                                                              248/556
3,288,404 A * 11/1966 Woodford .............. B64D 27/04
                                                              248/557
(Continued)

FOREIGN PATENT DOCUMENTS

EP     2 162 358       3/2010
EP     2 554 478 A1    2/2013
(Continued)

OTHER PUBLICATIONS

French Preliminary Search Report dated Feb. 2, 2017 in French Application 16 53824, filed on Apr. 28, 2016 (with English Translation of Categories of cited documents).
(Continued)

*Primary Examiner* — Benjamin P Lee
(74) *Attorney, Agent, or Firm* — Oblon, McClelland, Maier & Neustadt, L.L.P.

(57) ABSTRACT

An aircraft propulsion assembly includes: a gas generator coupled by a coupling mechanism to a thrust generator having a structural torque transmission gearbox, and a rigid cradle rigidly supporting the thrust generator in a first suspension plane and the gas generator in distinct second and third suspension planes, the cradle being for securing to a structural element of the aircraft via a vibration-filtering flexible connection.

12 Claims, 1 Drawing Sheet

(51) Int. Cl.
*B64D 27/18* (2006.01)
*B64D 27/26* (2006.01)
*B64D 27/10* (2006.01)
*F02C 7/20* (2006.01)
*F02K 3/06* (2006.01)

(52) U.S. Cl.
CPC ............... *B64D 27/26* (2013.01); *F02C 7/20* (2013.01); *F02K 3/06* (2013.01); *B64D 2027/264* (2013.01); *Y02T 50/44* (2013.01)

(58) Field of Classification Search
CPC ........ B64D 2027/262; B64D 2027/264; F02C 7/20
See application file for complete search history.

(56) References Cited

U.S. PATENT DOCUMENTS

| | | | | |
|---|---|---|---|---|
| 5,176,339 | A * | 1/1993 | Schmidt | B64D 27/00 244/131 |
| 9,738,392 | B2 * | 8/2017 | Hellegouarch | B64D 27/26 |
| 2008/0011932 | A1 * | 1/2008 | Stretton | B66C 1/10 248/544 |
| 2008/0315064 | A1 | 12/2008 | Dron et al. | |
| 2010/0176239 | A1 | 7/2010 | Marche | |
| 2013/0134257 | A1 | 5/2013 | Barber et al. | |
| 2015/0239569 | A1 | 8/2015 | Gallet et al. | |
| 2015/0360788 | A1 | 12/2015 | Hellegouarch et al. | |
| 2016/0159486 | A1 | 6/2016 | Poisson et al. | |

FOREIGN PATENT DOCUMENTS

| | | | | |
|---|---|---|---|---|
| FR | 2 917 711 | | 12/2008 | |
| FR | 2 987 347 | A1 | 8/2013 | |
| FR | 2 995 282 | | 3/2014 | |
| FR | 3053661 | A1 * | 1/2018 | ............. B64D 27/26 |
| FR | 3054202 | A1 * | 1/2018 | ............. B64D 33/02 |
| GB | 2523970 | A | 9/2015 | |
| WO | WO 2008/148722 | A1 | 12/2008 | |
| WO | WO 2014/111654 | A1 | 7/2014 | |
| WO | WO-2014111654 | A1 * | 7/2014 | ............. B64D 27/14 |
| WO | WO 2014/174222 | A1 | 10/2014 | |

OTHER PUBLICATIONS

Search Report dated Oct. 13. 2017 in United Kingdom Patent Application No. GB1706739.8.

* cited by examiner

AIRCRAFT PROPULSION ASSEMBLY WITH A FILTERED CRADLE

BACKGROUND OF THE INVENTION

The present invention relates to the general field of suspending a propulsion assembly on a suspension structure that is to be secured to a structural element of the aircraft that it propels. The invention relates more particularly to suspending a turboprop or a turbojet from a cradle that is to be secured to an airplane wing box.

In order to isolate the vibration as created by turboprops and transmitted to the airplane, turboprops are typically suspended from a cradle via filtering flexible suspensions. More precisely, such a suspension is generally performed via two transverse planes, namely a first plane at the front level with a gearbox that drives the propeller of the turboprop, and a second plane at the rear level with the rear of the gas generator, the gearbox being connected in rigid and structural manner to the gas generator. Reference may be made to Document WO 2014/174222, which describes an example of such a suspension.

With such an arrangement, the effectiveness of the filtering flexible suspensions that are used for suspending the turboprop from the cradle increases with increasing stiffness of the impedance of the downstream structure of the turboprop to which they are secured. However, turboprops are generally positioned so as to be cantilevered out to a considerable extent in front of the airplane wing on which they are secured, thereby limiting the structural stiffness of the cradle supporting them. The effectiveness of the suspension for filtering vibration is thus limited.

Furthermore, adding filtering flexible suspensions in the linkage between the turboprop, which generates vibration, and the wing to which the cradle situated further downstream is secured, gives rise to particular "flutter" modes that make it more complicated to adjust the overall dynamic behavior of the propulsion assembly as suspended in that way.

Furthermore, in order to ensure good operation of the turboprop and reduce clearances between its stators and rotors, it is important for the engine to present a degree of rigidity and to be accurately in alignment with the gearbox that drives the propeller. This constraint implies that it is necessary to integrate connecting rods or a structural casing in the propulsion assembly, thereby increasing its weight.

Furthermore, suspending a turboprop from a cradle via only two planes, one level with the gearbox and the other behind the gas generator, makes it necessary to remove the entire propulsion assembly constituted by the gas generator and the gearbox as a single unit whenever it is desired to take action on one or the other of those elements (e.g. for maintenance operations). This constraint lengthens operations of removing the engine and makes them more complicated.

OBJECT AND SUMMARY OF THE INVENTION

The main object of the present invention is thus to propose a suspension for a propulsion assembly that does not present the above-mentioned drawbacks.

In accordance with the invention, this object is achieved by an aircraft propulsion assembly comprising a gas generator coupled by a coupling mechanism to a thrust generator having a structural torque transmission gearbox, and a rigid cradle rigidly supporting firstly the thrust generator in a first suspension plane and secondly the gas generator in distinct second and third suspension planes, the cradle being for securing to a structural element of the aircraft via a vibration-filtering flexible connection.

The propulsion assembly of the invention is remarkable in that it provides structural decoupling between the gas generator and the thrust generator, the propulsion assembly being suspended from the cradle in three distinct suspension planes, two of which are dedicated to suspending the gas generator and one of which is dedicated to suspending the thrust generator, together with a vibration-filtering flexible connection between the rigid cradle and the structural element of the aircraft to which the propulsion assembly is to be mounted.

This suspension presents numerous advantages. The cradle provides a degree of axial freedom enabling the engine to expand thermally and serving to stiffen the engine, while guaranteeing that the low pressure turbine shaft of the gas generator is in alignment with the torque transmission gearbox. Thus, the suspension avoids the need for connecting rods or a structural casing connecting the torque transmission gearbox to the gas generator, thereby achieving a considerable saving in weight.

The suspension of the invention presents two suspension planes associated with the gas generator (instead of a single plane as in the prior art). Thus, when performing a maintenance operation, it is possible to remove the gas generator without it being necessary to remove the thrust generator, which constitutes a significant saving in time.

Furthermore, the propulsion assembly of the invention advantageously does not have flexible suspensions between the gas generator and the cradle (the supports being provided in rigid manner), thereby avoiding the first flutter modes of the engine on the cradle. This serves to simplify the design of the propulsion assembly in terms of its dynamic behavior.

In the invention, the vibration-filtering functions are offset to between the cradle and the structural element of the aircraft (e.g. the wing box of an airplane), thus making it possible to benefit from high impedance at the attachment points that is greater than the impedance available on the cradle. This improves the effectiveness of these filtering functions, thus enabling suspensions to be designed to be more rigid in order to limit movement of the propulsion assembly, with all of the benefits that that involves (in particular in terms of performance).

Preferably, the cradle supports the thrust generator in rigid manner via the torque transmission gearbox. The structural torque transmission gearbox that is rigidly secured to the cradle thus becomes a component of the cradle, thereby enabling the weight of the front frame of a traditional cradle to be reduced. It is also possible to obtain other benefits relating to the ability to retain moving parts (resulting from ruptured gearwheels in the torque transmission gearbox). Furthermore, the presence of a torque transmission gearbox that is rigidly connected to the cradle, and the suspension planes being offset to the gas generator on its own, simplify operations of removing the engine and guarantee proper alignment by using a coupling system between the gas generator and the thrust generator of the type comprising a small deflection universal joint.

Also preferably, the cradle comprises a main beam that extends parallel to a longitudinal axis of the gas generator, that is rigidly secured at one end to the torque transmission gearbox of the thrust generator in order to form the first suspension plane, and that is for securing at an opposite end via the vibration-filtering flexible connection to the structural element of the aircraft, and two transverse frames that are axially spaced apart from each other and secured rigidly to the gas generator in order to form the second and third suspension planes.

Advantageously, the main beam is secured to the torque transmission gearbox via a set of connecting rods.

The cradle may have two flexible suspensions for forming the vibration-filtering connection with the structural element of the aircraft.

The propulsion assembly may consist of an airplane turboprop, such that the thrust generator comprises a propeller that is coupled to the gas generator via a gearbox.

Alternatively, the propulsion assembly may consist in an airplane turbojet in which the thrust generator comprises two contrarotating propellers that are coupled to the gas generator via a gearbox.

Also alternatively, the propulsion assembly may consist in an airplane turbojet in which the thrust generator comprises a ducted fan that is coupled to the gas generator via reduction gearing.

BRIEF DESCRIPTION OF THE DRAWINGS

Other characteristics and advantages of the present invention appear from the following description given with reference to the accompanying drawings, which shows embodiments having no limiting character. In the figures.

DETAILED DESCRIPTION OF THE INVENTION

Figure 1:
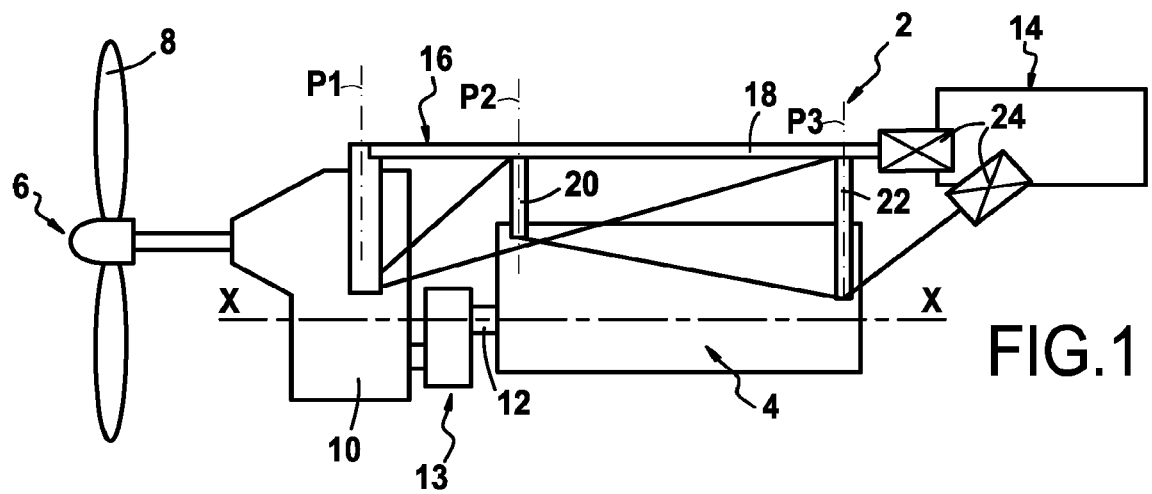
FIG. 1 is a diagrammatic side view of a propulsion assembly in a first embodiment (application of the invention to a turboprop having one propeller)

The invention applies to any aircraft propulsion assembly that comprises a gas generator coupled by a transmission shaft to a thrust generator and having a structural torque-transmitting gearbox, such as an airplane turboprop of the kind shown in FIG. 1.

In known manner, the turboprop 2 comprises a gas generator 4 driving rotation of a thrust generator 6, which itself comprises a propeller 8 and a gearbox 10 for transmitting torque to the propeller.

More precisely, the gas generator 4 comprises a low pressure turbine shaft 12 coupled to the gearbox 10 of the thrust generator via a coupling mechanism 13 so as to provide structural decoupling between the gas generator and the thrust generator.

The turboprop 2 is for securing to a wing box 14 of the airplane via a suspension structure referred to as a "cradle" 16.

The cradle 16 is in the form of a rigid structure comprising a main beam (or main bar) 18 that extends substantially parallel to a longitudinal axis X-X of the gas generator 4 and that has a front end secured in rigid manner to the gearbox 10 of the thrust generator 6 in order to form a first suspension plane P1 (referred to as the "front" suspension plane).

The cradle 16 also has two transverse frames 20 and 22 that are spaced apart axially from each other and connected to the main beam 18. At their free ends, each of these transverse frames is respectively secured in rigid manner to the gas generator 4 in order to form respectively a second suspension plane P2 (referred to as the "intermediate" suspension plane) and a third suspension plane P3 (referred to as the "rear" suspension plane).

The intermediate suspension plane of the cradle corresponding to the transverse frame 20 is of the conventional boomerang type having low weight. Specifically, no engine torque is taken up via this suspension plane, this torque take-up being offset to the rear suspension plane corresponding to the transverse frame 22.

The rear end of the main beam 18 of the cradle (remote from its front end secured to the gearbox 10) is secured to the wing box 14 of the airplane via a vibration-filtering connection.

In this example, the vibration-filtering connection is implemented using two flexible suspensions 24. For this purpose, various flexible suspensions can be used: laminated elastomer ball joints, stays filtered by elastomers, or metal cushions, etc. Reference may be made to Document FR 2 917 711, which describes an embodiment of such flexible suspensions.

Figure 2:
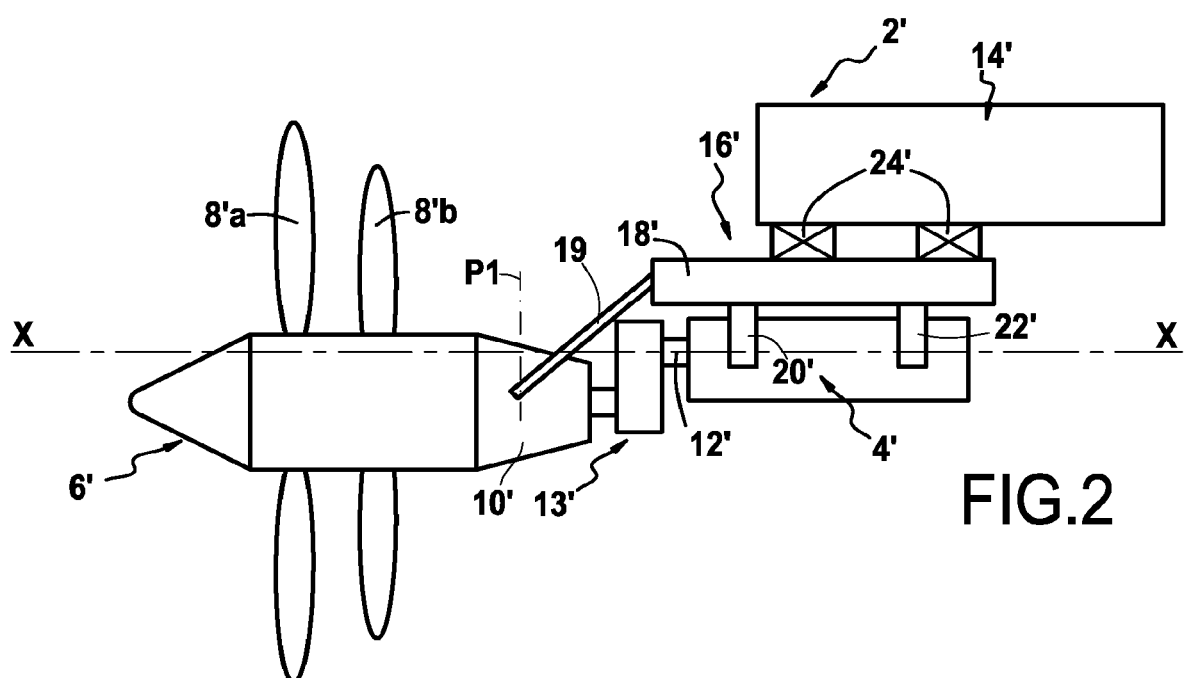
FIG. 2 is a diagrammatic side view of a propulsion assembly in a second embodiment (application of the invention to a turboprop having two unducted contrarotating propellers)

The invention also applies to an airplane turbojet with contrarotating propellers (also known as "open rotors"), as shown in FIG. 2.

This turbojet 2' comprises a gas generator 4' driving rotation of a thrust generator 6', itself having two contrarotating propellers 8'a and 8'b together with a gearbox 10' for transmitting torque to the two propellers 8'a and 8'b.

The gas generator 4' includes a low pressure turbine shaft 12' that is coupled to the gearbox 10' of the thrust generator via a coupling mechanism 13' so as to provide structural decoupling between the gas generator and the thrust generator.

In the example shown in FIG. 2, the propellers 8'a and 8'b are located upstream from the gas generator 4' (in a "puller" version), however they could equally well be placed downstream therefrom (in a "pusher" version).

In this example, the turbojet 2' is for securing to a wing box or to a pylon 14' of the airplane that it propels by means of a cradle 16'. The cradle is substantially identical to that described with reference to FIG. 1, i.e. it is in the form of a rigid structure comprising a main beam 18' that extends substantially parallel to a longitudinal axis X-X of the gas generator 4', having a front end secured to the gearbox 10' of the thrust generator 6' in order to form a first suspension plane P1 (referred to as the "front" suspension plane). This first suspension plane is defined as being a plane perpendicular to the longitudinal axis X-X of the gas generator and containing the attachment points between the cradle 16' and the gearbox 10'. In the event of the attachment points being axially offset relative to one another, consideration is given to the furthest forward attachment point(s).

The front end of the main beam 18' may be secured to the gearbox 10' via a set of connecting rods 19, which in this example are considered as forming part of the cradle 16'. The gearbox 10' is structural, e.g. having a structural casing. The casings of the coupling mechanism 13' and of the low pressure turbine shaft 12' may also be structural so that the gas generator 4' contributes to supporting the assembly constituted by the thrust generator 6' and the gearbox 10'.

Alternatively, the cradle 16' may be made without using connecting rods 19. For example, the front end of the main beam 18' could extend forwards as far as the first suspension plane P1 and could be connected to the gearbox 10' by a transverse frame. Nevertheless, this solution is less advantageous in terms of the weight of the cradle 16' and of the cantilevered-out weight of the assembly.

The cradle 16' also has two transverse frames 20' and 22' that are axially spaced apart from each other and connected to the main beam 18'. At their free ends, each of these transverse frames is respectively secured in rigid manner to the gas generator 4' so as to form respectively a second suspension plane (referred to as the "intermediate" suspension plane) and a third suspension plane (referred to as the "rear" suspension plane).

The rear end of the main beam 18' of the cradle (remote from its front end secured to the gearbox 10'), is secured to the wing box or to the pylon 14' of the airplane via a vibration-filtering connection, constituted in this example by two flexible suspensions 24'.

Figure 3:
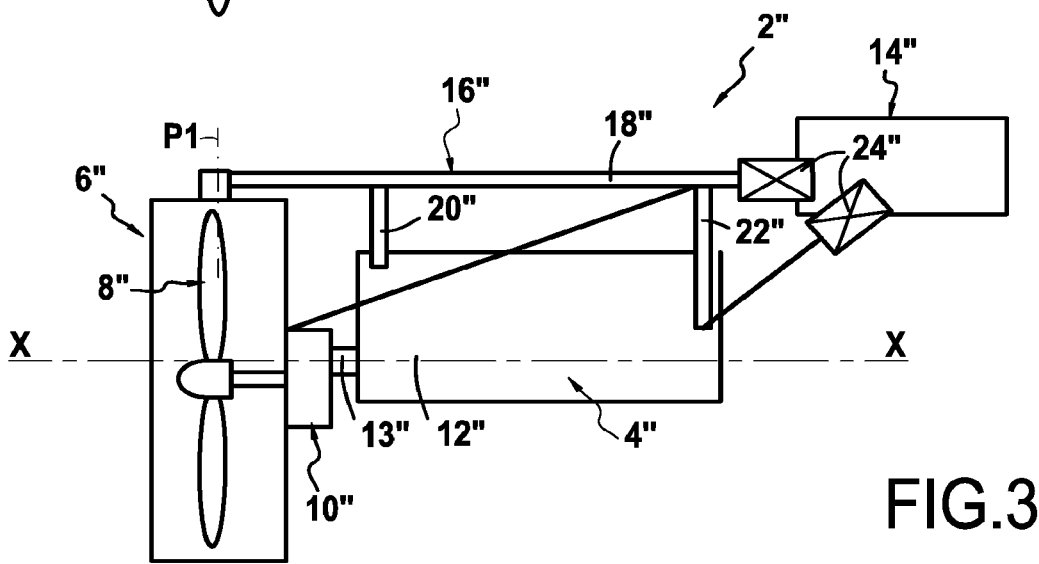
FIG. 3 is a diagrammatic side view of a propulsion assembly in a third embodiment (application of the invention to a turbojet jet having a ducted fan).

The invention also applies to an airplane ducted fan turbojet, as shown in FIG. 3.

The turbojet 2" comprises a gas generator 4" driving rotation of a thrust generator 6", itself comprising a ducted fan 8" and reduction gearing 10" for transmitting torque to the fan 8".

The gas generator 4" includes a low pressure turbine shaft 12" that is coupled to the gearing 10" of the thrust generator via a coupling 13" so as to provide structural decoupling between the gas generator and the thrust generator. By way of example, the gearing 10" is an epicyclic geartrain having its inlet via its sun gear, it then being possible for the low pressure turbine shaft 12" optionally to be in alignment with the axis of the gearing that corresponds to the axis of its sun gear.

In such an aligned configuration, the coupling 13" could consist in a removable connection arranged axially between the low pressure turbine shaft 12" and the sun gear of the gearing 10" in order to connect them together. The term "removable connection" is used to mean a connection that can be removed while the thrust generator 6" and possibly also the gas generator 4" remain in place in the cradle 16". As in the embodiments described with reference to FIGS. 1 and 2, this provision enables the gas generator to be removed without it being necessary to remove the thrust generator. This removable connection may for example comprise a shaft with curved fluting to provide a universal joint type transmission in order to compensate for small misalignments that may occur in operation, in particular because of vibration that can induce relative movements between the gearing and the low pressure turbine shaft.

In the configuration in which the low pressure turbine shaft 12" is not in alignment with the axis of the gearing 10", the coupling 13" may make use of a removable connection as mentioned above together with a transfer box for connecting a shaft of this connection to the sun gear of the gearing 10". The transfer box (not shown in FIG. 3) may be integrated in the same assembly as the gearing 10".

The turbojet 2" is for securing to a wing box or a pylon 14" of the airplane it propels via a cradle 16". This cradle is substantially identical to those described above with reference to FIGS. 1 and 2, i.e. it is in the form of a rigid structure comprising a main beam 18" that extends parallel to a longitudinal axis X-X of the gas generator 4" and that has a front end secured rigidly to the gearing 10" of the thrust generator 6" in order to form a first suspension plane (referred to as the "front" suspension plane).

The cradle 16" also has two transverse frames 20" and 22" that are axially spaced apart from each other and connected to the main beam 18". At their free ends, each of these transverse frames is respectively secured in rigid manner to the gas generator 4" in order to form respectively a second suspension plane (referred to as the "intermediate" suspension plane) and a third suspension plane (referred to as the "rear" suspension plane).

The rear end of the main beam 18" of the cradle (remote from its front end secured to the gearing 10") is secured to the wing box or to the pylon 14" of the airplane via a vibration-filtering connection constituted in this example by two flexible suspensions 24".

The invention claimed is:

1. An aircraft propulsion assembly comprising:
    a gas generator coupled by a coupling mechanism to a thrust generator having a structural torque transmission gearbox;
    a rigid cradle rigidly supporting the thrust generator in a first suspension plane and rigidly supporting the gas generator in distinct second and third suspension planes, the first, second, and third suspension planes being parallel to each other and perpendicular to an axis of the gas generator; and
    a vibration-filtering flexible connection which secures the rigid cradle to a structural element of the aircraft,
    wherein the rigid cradle comprises:
        a main beam that extends parallel to a longitudinal axis of the gas generator, that is rigidly secured at a first end to the torque transmission gearbox of the thrust generator in order to form the first suspension plane, and that is for securing, at a second end thereof via the vibration-filtering flexible connection, to the structural element of the aircraft; and
        two transverse frames connected to the main beam, the two transverse frames being axially spaced apart from each other and secured rigidly to the gas generator in order to form the second and third suspension planes.

2. The propulsion assembly according to claim 1, wherein the rigid cradle supports the thrust generator in rigid manner via the torque transmission gearbox.

3. The propulsion assembly according to claim 1, wherein the main beam is secured to the torque transmission gearbox via a set of connecting rods.

4. The propulsion assembly according to claim 1, wherein the rigid cradle has two flexible suspensions for forming the vibration-filtering flexible connection with the structural element of the aircraft.

5. The propulsion assembly according to claim 1, wherein the propulsion assembly is an airplane turboprop in which the thrust generator comprises a propeller that is coupled to the gas generator via a gearbox.

6. The propulsion assembly according to claim 1, wherein the propulsion assembly is an airplane turbojet in which the thrust generator comprises two contrarotating propellers that are coupled to the gas generator via a gearbox.

7. The propulsion assembly according to claim 1, wherein the propulsion assembly is an airplane turbojet in which the thrust generator comprises a ducted fan that is coupled to the gas generator via reduction gearing.

8. The propulsion assembly according to claim 1, wherein no engine torque is taken up via the second suspension plane.

9. The propulsion assembly according to claim 5, wherein the flexible suspensions include laminated elastomer ball joints.

10. The propulsion assembly according to claim 5, wherein the flexible suspensions include stays filtered by elastomers.

11. The propulsion assembly according to claim 5, wherein the flexible suspensions include metal cushions.

12. The propulsion assembly according to claim 1, wherein the two transverse frames are fixed to the main beam so as to be free of movement relative to each other.

* * * * *